July 26, 1960 E. N. ROSENBERG 2,946,585

TAPE TRANSPORT MECHANISM

Filed Dec. 14, 1956 3 Sheets-Sheet 1

INVENTOR.

Edgar N. Rosenberg

July 26, 1960 E. N. ROSENBERG 2,946,585

TAPE TRANSPORT MECHANISM

Filed Dec. 14, 1956 3 Sheets-Sheet 2

INVENTOR.

Edgar N. Rosenberg

TAPE TRANSPORT MECHANISM

Filed Dec. 14, 1956

INVENTOR.
Edgar N. Rosenberg

United States Patent Office 2,946,585

Patented July 26, 1960

2,946,585

TAPE TRANSPORT MECHANISM

Edgar N. Rosenberg, 6914 Mission Gorge Road, San Diego, Calif.

Filed Dec. 14, 1956, Ser. No. 628,292

7 Claims. (Cl. 271—2.3)

The present invention relates to improvements in tape transport mechanisms, more particularly to a mechanism for recording and playing back sound from tape or other similar medium. This invention relates particularly to a new and novel improvement in the construction of the main capstan and pressure roller bearings and a novel single motor drive and control system as will later be brought forth in the specification.

Many attempts have been made to obtain quietness and smoothness in tape transport drive systems. These attempts have usually resulted in the use of highly polished, extremely precise sleeve bearing surfaces and bearing journals. The clearance in these bearings has to be held to a minimum. In some instances precision ball bearings have been used.

The precision sleeve bearings used in conventional transports require a high degree of care during manufacture. After a limited amount of wear, these bearings that were once precision machined develop looseness which adds unwanted variations to the output of the tape transport mechanism.

Ball bearings, although precision manufactured, produce noise when used in a tape transport mechanism. Any microscopically small particles under the rolling balls cause noise in the tape transport output. The noise that ball bearings produce may be compared to that of a train wheel rolling over a small pebble on a railroad track. There is very little resilience between the contacting surfaces, therefore, the noise output is high.

The presently manufactured tape transports either use a two or a three motor drive system with the additional complications in the control system or a single motor drive system is used that does not adequately perform all the required functions. Many of the single motor transports will not adequately perform to spool the tape in the fast forward and the fast rewind functions. The control system as well as the driving mechanism are overly complicated on many of the single motor transports.

The majority of tape transport mechanisms operate at a tape speed of 7½ inches per second. If sound of a frequency of 7500 cycles per second (about the middle of the audible sound range) is recorded on this tape, it would mean that 7500 complete cycles would have to be recorded upon 7½ inches of tape. This would be the same as $^{7.5}/_{7500}$ or .001 inch of tape for each complete cycle.

From the above simple calculations, it can be seen that it is extremely important to keep bearing looseness or play down to a minimum in the capstan and pressure roller shafts.

The present invention relates to improvements in tape transport mechanisms, more particularly to an improved bearing structure for the capstan drive shaft and for the pressure roller shaft. The present invention also produces a simplified single motor drive system that more efficiently utilizes the motor torque to drive the transport in the fast forward and rewinding functions. In addition, the present invention utilizes a simple, yet smoothly operating drag and take up system for the tape.

It has long been recognized that for a tape transporting mechanism or a wire recorder to reproduce sound faithfully and with a minimum of distortion that the sound tape or wire has to be moved across the sound heads at a uniform pressure and rate. Any slight variations in the tape velocity causes unwanted variations in the recorded or "play back" sound. These variations show up as periodic variations in the output frequencies, or as noise at random frequencies. More commonly, these noises are known as wow, flutter, or random noise. Any slight irregularity or looseness of the capstan bearing system, or the associated pressure roller will be reflected as irregularities or unwanted noise in the output of the system.

The present invention reduces the spurious movements of the capstan and pressure roller along with the driven tape to a minimum by the use of preloaded "zero clearance" bearings. These bearings utilize some of the recent low coefficient of friction materials, such as nylon and Teflon.

The present invention also utilizes a unique drive system for the rewind and fast forward functions whereby the tape can be quickly and smoothly wound onto either of the tape reels. A single control knob is also provided to control all the functions of the recorder.

The present invention in addition utilizes a novel drag system that aids in maintaining a uniform drag on the driven tape and also a novel take up drive that maintains a smooth uniform pull to said driven tape.

Accordingly, an object of this invention is to provide a new and improved tape transport system having provisions for minimizing spurious or random movements of the driven tape.

Another object is to provide novel improvements in bearing supported structures for movably supporting the tape.

A further object is to provide new and improved bearing support systems for moving elements such as tape and the like having provisions for reducing to a minimum the spurious or random movements in the rotary supports for the tape.

Still another object is to provide a tape transport system having provision for operation under power of a single motor drive which utilizes additional flywheel filtering action.

Still another object is to provide a single control knob to control the various functions of the tape transporting mechanism.

A further object is to provide a new and improved clutch system for controlling and imparting motion to the tape reels.

Still another object is to provide a simplified brake system for stopping the tape transporting mechanism.

A further object is to provide a simplified take-up reel drive system.

Still another object is to provide a simple drag system for the supply reel of the tape transport mechanism.

Still another object is to provide a single motor drive system that more efficiently utilizes the motor torque to drive the transport in the fast forward and fast rewinding functions.

Still another object is to provide a tape transport mechanism that will smoothly handle the tape for all functions of operation and thereby minimize the stretching or breaking of the tape.

These and other objects, features, and advantages will become more fully apparent upon reference to the following detailed description when considered in connection with the drawings wherein.

Figures 1, 2:
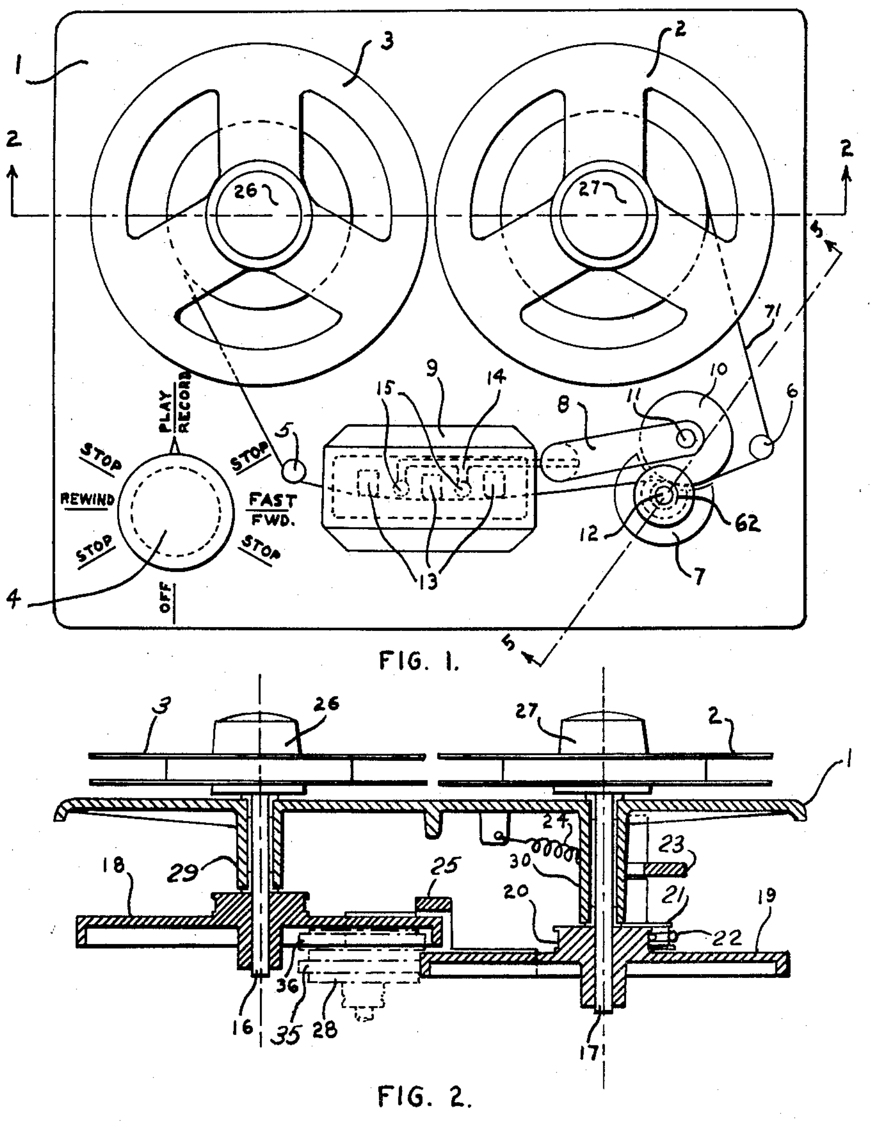
Fig. 1 is a plan view of the tape transport mechanism.
Fig. 2 is a sectional view taken through 2—2 of Fig. 1.

Referring more particularly to the drawings:

Fig. 1 shows the main supporting deck structure 1, illustrated in the form of a casting. The two tape reels 2 and 3, the two tape reel hold down knobs 26 and 27, and the control knob 4 are all rotatably supported by the main supporting deck structure 1. The tape guide posts 5 and 6, the capstan housing and upper bearing support 7, the capstan shaft upper bearing 12, the cover for the sound heads 9, the sound and erase heads 13 are all fixedly supported by the main supporting deck structure 1. The pressure roller pivot arm 8 is pivotally supported by the main supporting deck structure 1. The pressure roller upper bearing 11, pressure roller 10, and the tape lifter arm 14 (indicated in dotted lines) with the associated tape lifting pads are supported by the pressure roller pivot arm 8, the pressure roller being rotatably supported by the pressure roller upper bearing 11. The tape 71 is indicated as partially wound on the tape supply reel 3, threaded over the guide post 5, the sound and erase heads 13, between the capstan shaft 62 and the pressure roller 10 and thence over the guide post 6 to the tape take-up reel 2.

Fig. 2 indicates in more detail the manner in which the tape reels 2 and 3 are rotatably supported by the main supporting deck structure 1. The tape supply reel bearing boss 29 is indicated as an integral part of the main supporting deck structure 1 and rotatably supports the tape supply reel drive shaft 16. The tape supply reel 3 is held firmly in place on the upper end of the tape supply reel drive shaft 16 by the reel hold down knob 26. In a similar manner the tape take-up reel bearing boss 30 is also an integral part of the main supporting deck structure 1 and rotatably supports the tape take-up reel drive shaft 17. The tape take-up reel 2 is held firmly in place on the upper end of the tape take-up reel drive shaft 17 by the reel hold down knob 27. The drive shaft 17 also has the drive wheel 19 affixed to its lower end and the drive shaft 16 has the drive wheel 18 affixed to its lower end. The combination motor flywheel and drive roller 28 is indicated in phantom view showing how it cooperates with the drive wheels 18 and 19. The drive roller tire 36 is mounted on the drive roller 28 and serves to cooperate with drive wheel 18. The drive roller tire 35 is also mounted on the combination flywheel and drive roller 28 and serves to cooperate with drive wheel 19. The take-up reel drive pulley 20 is an integral part of the drive wheel 19. The take-up drive belt 22 passes across the take-up reel drive pulley 20 and also passes around the take-up drive idler pulley 21. The idler pulley pivot arm 23 is partially shown with the take-up drive idler pulley 21 rotatably attached. Spring 24 connects on one of its ends to the main supporting deck structure 1 and on its other end to the idler pulley pivot arm 23.

In Fig. 2 the brake arm 25 is shown in a sectional view showing its close proximity with the drive wheels 18 and 19. The motor swivel bearing boss 31 is an integral part of the main supporting deck structure 1 and rotatably supports the motor swivel shaft 32. The motor mount plate 33 is affixed to the lower end of the motor swivel shaft 32. The drive motor 34 is supported by the motor mount plate 33. The motor drive pulley 37 is an integral part of the combination motor flywheel and drive roller . The capstan drive belt 38 passes over the motor drive pulley 37 and also over the capstan flywheel 63.

Figures 3, 4:
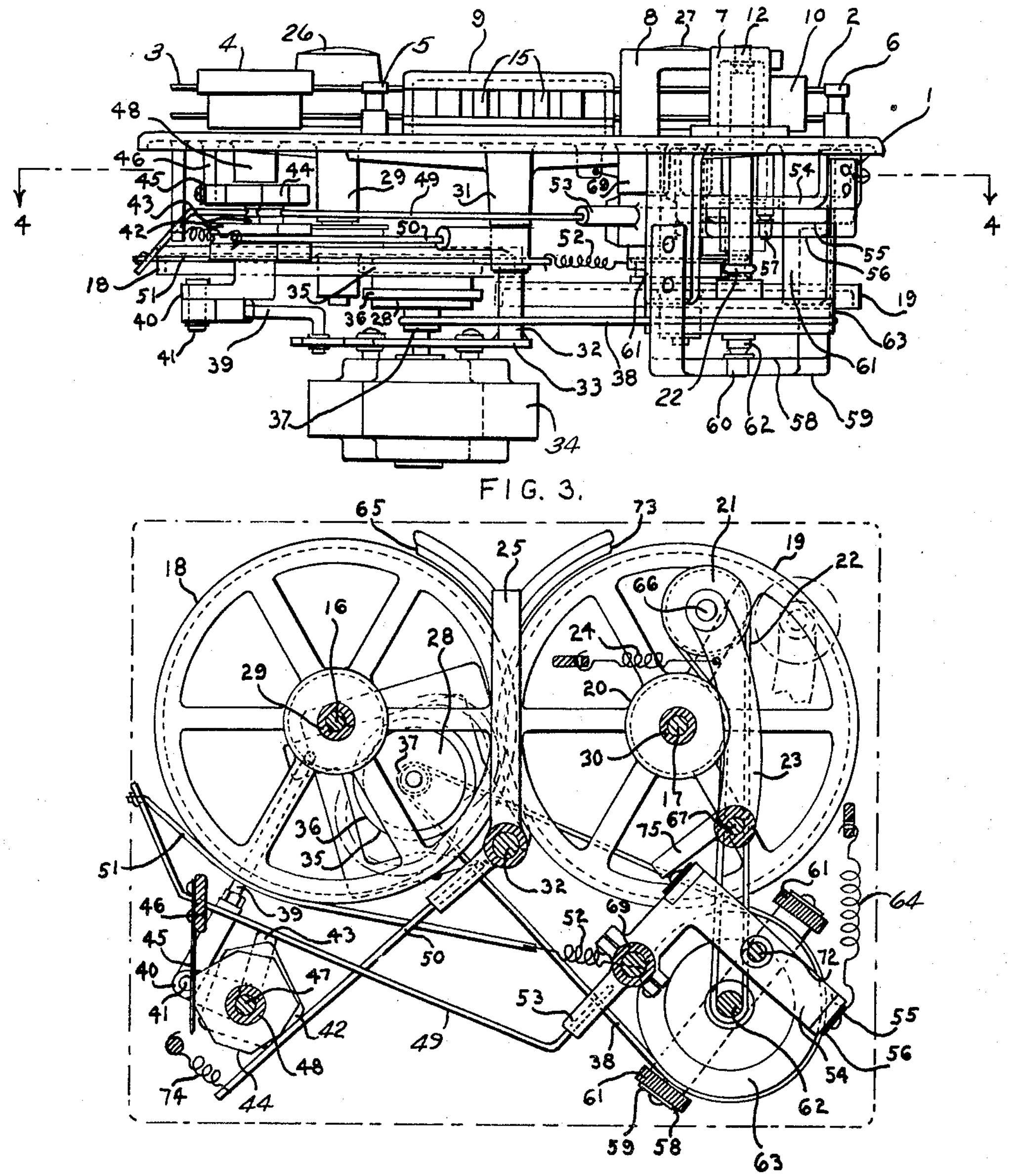
Fig. 3 shows a front elevation view of the tape transport mechanism.
Fig. 4 shows a sectional view taken through 4—4 of Fig. 3.

An adjustable motor pivot linkage 39 is connected to the motor shifting crank-arm 40 by the motor shifting crank-pin 41 on its one end and the other end of the pivot linkage 39 connects to the motor mount plate 33, as best seen in Fig. 4.

In Fig. 4 the brake arm 25 is shown as pivotally mounted on the motor swivel shaft 32. The brake linings 65 and 73 are fastened to the brake arm 25. A spring type brake actuating lever 50 is shown fastened at one of its ends to the brake arm 25 and held in close engagement with the brake actuating cam 42 by the brake lever pull back spring 74 at its other end.

A spring bowed type pressure roller actuating lever 49 is shown fastened at one of its ends to the pressure roller pivot assembly clamp 53 and at its other end is fastened one end of the supply reel drag 51. The other end of the supply reel drag 51 is connected by the supply reel drag tension spring 52 to the protruding lower end of the pressure roller pivot arm 8. The pressure roller pivoting framework 54 is clamped to the lower end of the pressure roller pivot arm 8 by means of the pressure roller pivot assembly clamp 53.

A pull-back spring 64 for the pressure roller pivoting framework 54 holds the spring type pressure roller actuating lever 49 in close contact with the pressure roller actuating cam 43. The motor shifting crank arm 40, the brake actuating cam 42, the pressure roller actuating cam 43, and the control knob 4 are all fastened to the control knob shaft 47. The control knob shaft 47 is rotatably supported by the control knob bearing boss 48.

A positioning cam spring is supported at one of its ends by the positioning cam spring support 46 and its other end is spring loaded against the control knob positioning cam 44.

Figures 6, 7:
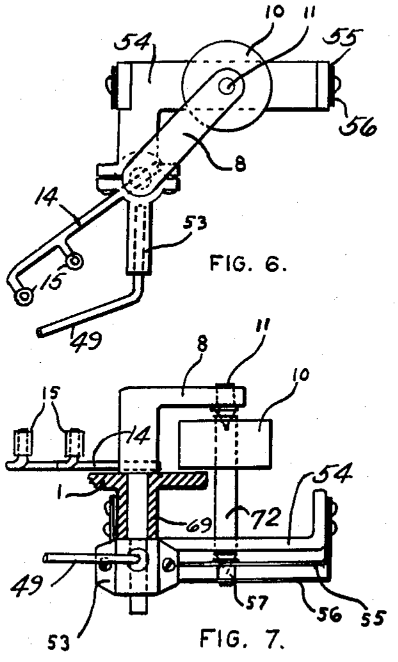
Fig. 6 is a top view showing details of the pressure roller pivoting framework and the tape lifting mechanism.
Fig. 7 is a front view of the pressure roller pivoting framework showing the spring loaded bearing support structure for the pressure roller.

The pressure roller spring loaded bearing 57 is yieldably supported by the pressure roller bearing pressure springs 55 and 56. The pressure roller bearing pressure springs 55 and 56 are indicated in Figs. 6 and 7 as being made of flat or ribbon like spring stock and as being supported at their outer ends by the pressure roller pivoting framework 54. The springs 55 and 56 urge the pressure roller spring loaded bearing 57 into a preloaded bearing fit with the lower conical bearing surface of the pressure roller shaft 72. Thereby the upper end of the pressure roller shaft 72 is urged into a preloaded fit with the pressure roller upper bearing 11.

Figure 5:
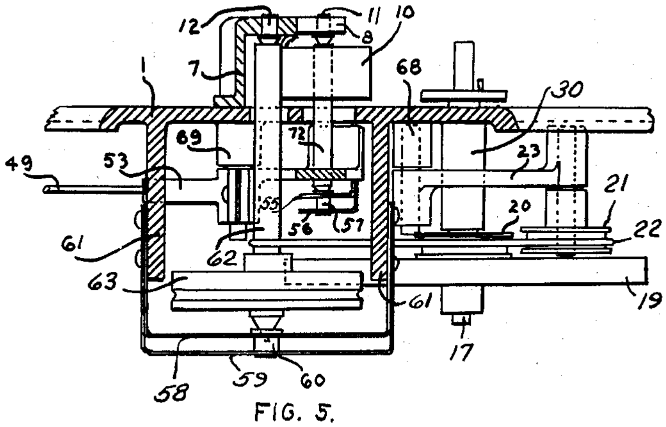
Fig. 5 is a sectional view taken through 5—5 of Fig. 1.

The lower capstan bearing 60 is yieldably supported by the lower capstan shaft bearing pressure springs 58 and 59. The lower capstan shaft bearing pressure springs 58 and 59 are indicated in Fig. 5 as being made of flat or ribbon like spring stock and as being supported at their outer ends by the capstan shaft bearing pressure spring supports 61. The springs 58 and 59 urge the lower capstan bearing 60 into a preloaded fit with the lower conical bearing surface of the capstan shaft 62. Thereby the upper end of the capstan shaft 62 is urged into a preloaded fit with the capstan shaft upper bearing 12. The idler pulley pivot arm shaft 67 is rigidly supported at one of its ends by the supporting boss 68 and at its other end pivotally supports the idler pulley pivot arm 23. The take-up drive idler pulley shaft 66 is affixed at one of its ends to the idler pulley pivot arm 23 and its other end rotatably supports the take-up drive idler pulley 21. The actuating arm 75 is an integral part of the idler pulley pivot arm 23 and serves to cooperate with the pressure roller pivoting framework 54.

In Fig. 7 can be seen more clearly the manner in which the pressure roller pivot arm bearing boss 69 pivotally supports the pressure roller pivot arm 8, the pressure roller pivoting framework 54 and the associated pressure roller 10.

Figure 8:
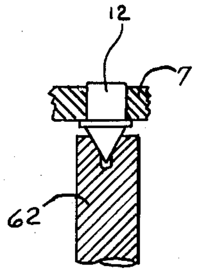
Fig. 8 is a detail view of the upper bearing arrangement as used for the capstan drive shaft and for the pressure roller shaft.

Fig. 8 shows in more detail an upper bearing structure for both the capstan shaft 62 and for the pressure roller shaft 72.

Figure 9:
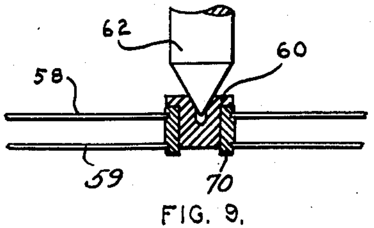
Fig. 9 is a detail view of the spring loaded lower bearing arrangement as used for the capstan drive shaft and for the pressure roller shaft.

Fig. 9 shows in more detail the lower bearing structure for both the capstan shaft 62 and for the pressure roller shaft 72. The lower bearing 60 is supported by the lower capstan bearing boss 70. The springs 58 and 59 serve to yieldably support the bearing boss 70.

*Operation*

The operation of the described embodiment of the present invention is believed to be readily apparent and is briefly summarized at this point. For the play or record function of the tape transporting mechanism, the tape 71 is mounted on the supply reel 3 and threaded over the guide post 5, across the sound and erase heads 13, between the pressure roller 10 and capstan shaft 62, across the tape guide post 6 and partially spooled on the tape take-up reel 2. With the control knob 4 set at play or record, the pressure roller actuating cam 43 through the action of the control knob shaft 47 urges the spring type pressure roller actuating lever 49 outward in a direction away from the control knob shaft 47 thereby causing the pressure roller pivot assembly clamp 53 to act on the pressure roller pivoting framework 54 and the associated pressure roller 10 causing the pressure roller 10 to be urged into spring contact with the capstan shaft 62. The spring type pressure roller actuating lever 49 exerts a springing force to hold the presssure roller 10 in preloaded rolling engagement with the capstan 62. As the pressure roller actuating cam 43 forces the spring type pressure roller actuating lever 49 outward, it moves the supply reel drag 51 into rubbing engagement with the drive wheel 18. At the same time the actuating arm 75, which is held in contact with the pressure roller pivoting framework 54 by the idler pulley pivot arm spring 24, is allowed to pivot such that the idler pulley pivot arm 23 moves towards the tape take-up reel drive shaft 17. The idler pulley pivot arm tension spring 24 thereby moves the take-up drive idler pulley 21, such that its associated take-up drive belt 22 is held in rubbing engagement with the take-up reel drive pulley 20. As the pressure roller pivot arm 8 pivots towards the capstan shaft 62, the tape lifter arm 14 pivots such that the tape lifting pads 15 are moved in a direction to allow the tape 71 to bear directly on the sound and erase heads 13.

The positioning of the pressure roller actuating cam 43 thus serves to actuate the supply reel drag 51, the pressure roller 10, the take-up drive belt 22 and the tape lifting pads 15.

With the control knob 4 set at play or record and with the drive motor 34 running in a clockwise direction looking down in Fig. 4 the motor drive pulley 37 imparts motion to the capstan drive belt 38 which in turn imparts rotary motion to the capstan flywheel 63 and the capstan shaft 62. The tape 71, passing between the capstan shaft 62 and the pressure roller 10, is pulled in a direction to pay off from the tape supply reel 3. The tape supply reel 3 imparts a slipping type hold back action to the tape caused by the cord-like supply reel drag 51 rubbing against the rim of the drive wheel 18. At the same time the take-up drive belt 22 rubbing against the take-up drive pulley 20 imparts a slipping take-up action to the tape take-up reel 2. The tape 71 that is passed between the pressure roller 10 and the capstan shaft 62 is thus stored on the tape take-up reel 2. The slipping action of the supply reel drag 51 and the take-up drive belt 22 compensates for the changing diameter of the spooling tape.

For the play or record function, the brake arm 25 is in a central position, such that neither brake lining 65 or 73 is contacting a drive wheel 18 or 19. Also during this function neither of the drive roller tires 35 or 36 are contacting either of the drive wheels 18 or 19.

For functions of the tape transport other than play or record, the pressure roller actuating cam 43 is positioned such that it allows the pull-back spring for the pressure roller assembly 64 to pull the pressure roller 10 away from the capstan shaft 62 and at the same time moving the supply reel drag 51 out of rubbing engagement with the drive wheel 18 also moving the take-up drive belt out of engagement with the take-up reel drive pulley 20 and actuating the tape lifting pads to move the tape 71 off from the sound and erase heads 13.

For rewinding, the control knob 4 is turned to the rewind position indicated in Fig. 1. The motor shifting crank arm 40 is thus positioned such that the adjustable motor pivot linkage 39 acts on the motor mount plate 33, thereby holding the drive roller tire 36 in rolling contact with the inside of the rim of drive wheel 18. With the drive motor 34 and its associated combination motor flywheel and drive roller 28 rotating in a clockwise direction as viewed in Fig. 4 (dotted lines), the drive wheel 18 is driven in a clockwise direction. The tape supply reel drive shaft 16 and its associated tape supply reel 3 are thus also driven in a clockwise direction. The tape 71 is in this manner rewound onto the tape supply reel 3 at a fast rate relative to the recording or playing speed.

To stop the fast rewinding tape, the control knob 4 can be turned either clockwise or counterclockwise to either of the stop positions indicated as immediately adjacent to the rewind position. The control knob 4 serves to position the brake actuating cam 42, such that it acts to allow the spring type brake actuating lever 50 to be pulled in a direction towards the control knob shaft 47 by the brake lever pull back spring 74. The movement of the spring type brake actuating lever 50 thus causes the brake arm 25 to move the brake lining 73 into engagement with the drive wheel 19 thereby braking the drive wheel 19, the tape take-up reel drive shaft 17, and the associated tape take-up reel 2 to a stop. The tape take-up reel 2 therefore stops the tape 71, which in turn stops the supply reel 3.

During the rewinding and during the stopping functions, the pressure roller 10 is not engaged with the capstan shaft 62. During these functions the tape 71 is held off from the sound heads 13.

For the fast forward spooling of the tape, the control knob 4 is turned to the fast forward position indicated in Fig. 1. The motor shifting crank arm 40 is thus positioned, such that the adjustable motor pivot linkage 39 acts on the motor mount plate 33 thereby holding the drive roller tire 35 in rolling contact with the outside of the rim of drive wheel 19. With the drive motor 34 and its associated combination motor flywheel and drive roller 28 rotating in a clockwise direction as viewed in Fig. 4 (dotted lines), the drive wheel 19 is driven in a counterclockwise direction. The tape take-up reel drive shaft 17 and its associated tape take-up reel 2 are thus driven in a counterclockwise direction. The tape 71 is in this manner wound on to the tape take-up reel 2 at a fast rate relative to the recording or playing back speed.

To stop the fast forward motion of the tape 71, the control knob 4 can be turned either clockwise or counterclockwise to either of the stop positions indicated as immediately adjacent to the fast forward position. The control knob 4 serves to position the brake actuating cam 42, such that it acts to urge the spring type brake actuating lever 50 in a direction away from the control knob shaft 47. The movement of the spring type brake actuating lever 50 thus causes the brake arm 25 to move the brake lining 65 into engagement with the drive wheel 18 thereby braking the drive wheel 18, the tape supply reel drive shaft 16, and the associated tape supply reel 2 to a stop.

During the fast forward and during the stopping functions, the pressure roller 10 is not engaged with the capstan shaft 62. During these functions the tape 71 is held off from the sound heads 13. The control knob 4 and its associated crank arm 40 as well as the actuating cams 42 and 43 are arranged such that by turning the control knob 4 the tape transport mechanism can be changed from the fast forward function to the stop function thence to the play or record function and thence to the stop function and thence to the rewind function. Similarly, continuing to turn the control knob 4 in the same direction, the tape transport can be changed from the rewind function to the stop function. By continuing to turn the control knob 4 in the same rotational direction, the transport can again be made to function in the fast forward operation.

From the above description, it can be noted that the transport can be actuated to operate directly from fast forward to stop and thence to fast rewind without the necessity of actuating the playback or record function.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A tape transporting mechanism comprising a tape deck, a tape, a capstan shaft having conical shaped bearing surfaces at each of its ends, means to rotate said capstan shaft, said tape passing around and being driven by said capstan shaft, a pair of conical bearings, one of said conical bearings rigidly supported by said deck structure and rotatably supporting and mating with one end of said capstan shaft, and the other of said conical bearings yieldably supported from said supporting deck structure and adapted to move along the center line of said capstan shaft with no side to side clearances and urged into a preloaded mating working contact with the conical bearing surface at the other end of said capstan shaft thereby effecting essentially zero clearances between said conical bearings and the conical ends of said capstan shaft.

2. A tape transporting mechanism wherein there is provided a deck structure, a tape, a capstan shaft, said capstan shaft rotatably supported by said deck structure, means to rotate said capstan shaft, a pressure roller, a pressure roller shaft having conical shaped bearings at each of its ends and having said pressure roller mounted on said pressure roller shaft, a pivoting framework pivotally mounted on said deck structure for rotatably supporting said pressure roller shaft, a pair of conical bearings, one of said bearings rigidly supported by said pivoting framework and rotatably supporting and engaging the conical bearing surface at one end of said pressure roller shaft, the other of said conical bearings yieldably supported by said pivoting framework and springingly urged along the center line of said pressure roller shaft with no side to side clearances into rotatably supporting and engaging the conical bearing surface at the other end of said pressure roller shaft, means for springingly urging said pressure roller into rolling frictional engagement with said capstan shaft, thus with said tape passing between said capstan shaft and said pressure roller a minimum of spurious movements will be imparted to said tape.

3. In a tape transporting mechanism a means for imparting a smooth uniform motion to a sound recording and play-back tape, comprising a deck structure, a capstan shaft having conical shaped bearing surfaces at each of its ends, means for rotating said capstan shaft, a pair of conical bearings, one of said bearings rigidly supported by said deck structure and rotatably supporting one end of said capstan shaft, a tape passing around and being driven by said capstan shaft, a pair of symmetrical flat spring elements having upturned ends and fastened at said ends to said deck structure and having the other of said conical bearings fastened to the center of said flat springs and urged into a preloaded working contact with the other conical end of said capstan shaft, the upturned portions of said pair of symmetrical flat spring elements deflect to allow spring loaded bearing compensating movement along the center line of said capstan shaft.

4. In a sound recording or playback mechanism an effectively zero clearance shaft and bearing structure comprising a shaft, said shaft having conical bearing surfaces at each of its ends, a pair of conical bearings, a bearing supporting structure, one of said conical bearings rigidly affixed to said supporting structure, said conical bearing engaged with and rotatably supporting one end of said shaft, means for urging the other of said conical bearings with no side to side motion or side clearance along the center line of said shaft into a preloaded close working relationship with the conical bearing surface at the other end of said shaft.

5. A pressure roller supporting structure for sound recording and playback devices comprising a deck structure, a pivoting framework pivotally mounted on said deck structure, a pressure roller shaft having conical bearing surfaces at each of its ends, a pressure roller mounted on said pressure roller shaft, a pair of conical bearings, one of said conical bearings mounted fixedly to said pivoting framework and rotatably supporting one end of said pressure roller shaft, means for urging the other of said conical bearings with no side to side motion or side clearance along the center line of said pressure roller shaft into a close preloaded working relationship with the conical bearing surface at the other end of said pressure roller shaft.

6. In a tape transporting mechanism a means for providing a smooth, uniform movement to a sound recording and playback tape, comprising a deck structure, a capstan shaft having conical shaped bearing surfaces at each of its ends, a means for rotating said capstan shaft, a pair of conical bearings, one of said conical bearings rigidly supported by said deck structure and rotatably supporting one end of said capstan shaft, a symmetrical spring element yieldably supported from said deck structure and supporting the other of said conical bearings at its axis of symmetry, said symmetrical spring adapted to deflect along the center line of said capstan shaft into a preloaded working contact with the conical bearing surface at the other end of said capstan shaft, a pressure roller, means for rotatably supporting and urging said pressure roller into rolling contact with said capstan shaft, a sound recording and playback tape, said tape passing between said pressure roller and said capstan shaft.

7. The invention as claimed in claim 6 wherein said pressure roller supporting means comprises a pivotally mounted framework pivotally supported from said deck structure, a pressure roller shaft having conical shaped bearing surfaces at each of its ends and having said pressure roller mounted on said pressure roller shaft, a second pair of conical bearings, one of said second pair of conical bearings being rigidly supported by said pivotally mounted framework and functioning to support one end of said pressure roller shaft, a symmetrical spring element yieldably supported from said pivotally mounted framework and supporting the other of said second pair of conical bearings at its axis of symmetry, said symmetrical spring adapted to deflect along the center line of said pressure roller shaft into a preloaded working contact with the conical bearing surface at the other end of said pressure roller shaft thereby effecting a very close effectively zero clearance between the bearing surfaces of said pressure roller shaft and said conical bearings.

References Cited in the file of this patent

UNITED STATES PATENTS

| | | |
|---|---|---|
| 1,740,605 | Klein | Dec. 24, 1929 |
| 2,201,324 | Sinclair | May 21, 1940 |

(Other references on following page)

UNITED STATES PATENTS

| | | |
|---|---|---|
| 2,246,738 | Lauck | June 24, 1941 |
| 2,499,699 | Tinkham | Mar. 7, 1950 |
| 2,555,643 | Harrison | June 5, 1951 |
| 2,615,069 | Gallagher | Oct. 21, 1952 |
| 2,646,989 | Davis | July 28, 1953 |
| 2,680,613 | Williams | June 8, 1954 |
| 2,685,415 | Wittel et al. | Aug. 3, 1954 |
| 2,687,881 | Barany et al. | Aug. 31, 1954 |
| 2,708,609 | Triplett | May 17, 1955 |
| 2,712,448 | Schroter | July 5, 1955 |
| 2,782,263 | Hoehn et al. | Feb. 19, 1957 |
| 2,783,951 | Munroe | Mar. 5, 1957 |
| 2,838,314 | Selsted | June 10, 1958 |